(12) United States Patent
Ranganathan

(10) Patent No.: US 10,489,220 B2
(45) Date of Patent: Nov. 26, 2019

(54) PRIORITY BASED SCHEDULING

(71) Applicant: Microsoft Technology Licensing, LLC, Redmond, WA (US)

(72) Inventor: Bhalakumaaran Erode Ranganathan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 444 days.

(21) Appl. No.: 15/416,275

(22) Filed: Jan. 26, 2017

(65) Prior Publication Data

US 2018/0210756 A1 Jul. 26, 2018

(51) Int. Cl.
  *G06F 9/46* (2006.01)
  *G06F 9/54* (2006.01)
(52) U.S. Cl.
  CPC .................... *G06F 9/542* (2013.01)
(58) Field of Classification Search
  None
  See application file for complete search history.

(56) References Cited

U.S. PATENT DOCUMENTS

| | | | | |
|---|---|---|---|---|
| 5,327,557 A * | 7/1994 | Emmond | .............. | G06F 9/4881 707/741 |
| 5,640,563 A * | 6/1997 | Carmon | ................ | G06F 9/4887 718/102 |
| 6,363,411 B1 * | 3/2002 | Dugan | .............. | H04M 3/42136 379/201.01 |
| 6,393,481 B1 * | 5/2002 | Deo | ................... | H04M 3/42136 340/522 |
| 6,665,701 B1 * | 12/2003 | Combs | .................. | G06F 9/5011 709/200 |
| 6,904,483 B2 * | 6/2005 | Koning | ................. | G06F 9/4881 710/244 |

(Continued)

FOREIGN PATENT DOCUMENTS

WO  2001040959 A1  6/2001
WO  2015179092 A1  11/2015

OTHER PUBLICATIONS

"CDP:Priority Queue Pattern", http://en.clouddesignpattern.org/index.php/CDP:Priority_Queue_Pattern, Published on: Nov. 28, 2012, 2 pages.

(Continued)

*Primary Examiner* — Hiren P Patel
(74) *Attorney, Agent, or Firm* — Workman Nydegger

(57) ABSTRACT

Embodiments disclosed herein are related to systems and methods for a scheduling manager or other element of a distributed computing system to schedule events performed by a various computing systems based on a priority of the events. The distributed computing system includes one or more processors and system memory having stored thereon executable instructions. When the executable instructions are executed by the processors, the computing system receives a new event that is to be added to a queue of events that are to be executed by the distributed computing system, determines that there is a current active event in the queue, compares a priority of the new event with a priority of the current active event, and based on the comparison, modifies an order of the events in the queue by updating the event in the queue that is to be the current active event.

12 Claims, 10 Drawing Sheets

(56) References Cited

U.S. PATENT DOCUMENTS

| | | | | |
|---|---|---|---|---|
| 6,961,720 | B1* | 11/2005 | Nelken | G06F 9/4881 706/47 |
| 7,016,955 | B2* | 3/2006 | Martin | H04L 41/0213 340/506 |
| 7,421,273 | B2 | 9/2008 | Diepstraten et al. | |
| 7,516,456 | B2* | 4/2009 | Aguilar, Jr. | G06F 9/4881 718/102 |
| 8,582,579 | B2 | 11/2013 | Yousefi et al. | |
| 8,645,321 | B1* | 2/2014 | Liu | G06F 16/215 707/613 |
| 8,949,839 | B2 | 2/2015 | Balasubramaniam et al. | |
| 8,949,842 | B2* | 2/2015 | Krishnan | G06F 9/5072 718/104 |
| 8,982,891 | B2* | 3/2015 | Turgeon | H04L 43/08 370/241 |
| 9,197,576 | B2 | 11/2015 | Balasubramanian et al. | |
| 9,934,066 | B2* | 4/2018 | Barraclough | G06F 16/957 |
| 2002/0083063 | A1* | 6/2002 | Egolf | G06F 9/4881 |
| 2002/0087757 | A1* | 7/2002 | Wagner | G06F 9/4881 710/54 |
| 2002/0194249 | A1* | 12/2002 | Hsieh | G06F 5/065 718/103 |
| 2004/0117791 | A1* | 6/2004 | Prasad | G06F 9/4881 718/100 |
| 2005/0021713 | A1* | 1/2005 | Dugan | H04M 3/42136 709/223 |
| 2005/0081203 | A1* | 4/2005 | Aguilar, Jr. | G06F 9/4881 718/100 |
| 2005/0223057 | A1* | 10/2005 | Buchheit | G06Q 10/107 709/203 |
| 2006/0080486 | A1* | 4/2006 | Yan | G06F 9/5038 710/123 |
| 2007/0206620 | A1* | 9/2007 | Cortes | H04L 29/06027 370/412 |
| 2007/0220517 | A1 | 9/2007 | Lippett | |
| 2007/0226742 | A1* | 9/2007 | Hung | G06F 9/4881 718/103 |
| 2007/0263650 | A1* | 11/2007 | Subramania | H04L 47/10 370/412 |
| 2008/0133812 | A1* | 6/2008 | Kaiser | G06F 9/542 710/263 |
| 2010/0087941 | A1* | 4/2010 | Assaf | G06Q 10/06 700/101 |
| 2010/0241822 | A1* | 9/2010 | Chang | G06F 12/1036 711/207 |
| 2011/0178962 | A1 | 7/2011 | Sood | |
| 2012/0096470 | A1 | 4/2012 | Bartfai-walcott et al. | |
| 2012/0198462 | A1* | 8/2012 | Cham | G06F 9/5038 718/103 |
| 2012/0278513 | A1* | 11/2012 | Prevost | G06F 9/5038 710/39 |
| 2012/0310620 | A1* | 12/2012 | Resmerita | G06F 11/3664 703/17 |
| 2013/0055275 | A1* | 2/2013 | Comeau | G06F 9/4881 718/103 |
| 2015/0074676 | A1* | 3/2015 | Maruyama | G06F 9/4881 718/103 |
| 2015/0082312 | A1 | 3/2015 | Meijer et al. | |
| 2015/0347179 | A1* | 12/2015 | Barraclough | G06F 16/957 718/103 |
| 2016/0034314 | A1* | 2/2016 | Xu | G06F 9/4887 718/103 |
| 2016/0179993 | A1 | 6/2016 | Maturana et al. | |
| 2016/0302222 | A1* | 10/2016 | Hung | H04W 72/1242 |
| 2017/0010918 | A1* | 1/2017 | Sato | G06F 9/4881 |
| 2018/0143759 | A1* | 5/2018 | Chang | G06F 3/0418 |

OTHER PUBLICATIONS

"Multi-Level Priority Queues", http://www.cisco.com/c/en/us/td/docs/ios/12_2sb/feature/guide/mpq.html, Published on: Dec. 5, 2006, 16 pages.

"Priority queue", https://en.wikipedia.org/wiki/Priority_queue, Retrieved on: Nov. 25, 2016, 7 pages.

"Bucket queue", https://en.wikipedia.org/wiki/Bucket_queue, Retrieved on: Nov. 25, 2016, 2 pages.

"Priority Queue Pattern", https://msdn.microsoft.com/en-us/library/dn589794.aspx, Retrieved on: Nov. 25, 2016, 6 pages.

* cited by examiner

*600*

RECEIVING A NEW EVENT THAT IS TO BE ADDED TO A QUEUE OF EVENTS THAT ARE TO BE EXECUTED BY THE DISTRIBUTED COMPUTING SYSTEM  *610*

DETERMINING THAT THERE IS A CURRENT ACTIVE EVENT IN THE QUEUE  *620*

COMPARING A PRIORITY OF THE NEW EVENT WITH A PRIORITY OF THE CURRENT ACTIVE EVENT  *630*

BASED ON THE COMPARISON, MODIFYING AN ORDER OF THE EVENTS IN THE QUEUE BY UPDATING THE EVENT IN THE QUEUE THAT IS TO BE THE CURRENT ACTIVE EVENT  *640*

RECEIVING A NEW EVENT THAT IS TO BE ADDED TO A QUEUE OF EVENTS THAT ARE TO BE EXECUTED BY THE DISTRIBUTED COMPUTING SYSTEM, THE NEW EVENT AND THE EVENTS IN THE QUEUE INCLUDING PRIORITY INFORMATION AND REORDER INFORMATION
710

UPDATING AN ORDER OF THE EVENTS IN THE QUEUE WHEN THE PRIORITY INFORMATION OF THE RECEIVED NEW EVENT INDICATES A HIGHER PRIORITY THAN THE PRIORITY INFORMATION OF A CURRENT ACTIVE EVENT IN THE QUEUE, WHEREIN DURING UPDATING THE ORDER OF THE EVENTS IN THE QUEUE, THE REORDER INFORMATION OF AT MOST TWO OF THE EVENTS IS UPDATED
720

*Figure. 7*

PRIORITY BASED SCHEDULING

BACKGROUND

A priority queue is a data structure where each element has a "priority" associated with it. In a priority queue, an element with high priority is served before an element with a low priority. If two elements have the same priority, they may be served according to their order in the queue.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to systems and methods for a scheduling manager or other element of a distributed computing system to schedule events performed by a various computing systems based on a priority of the events. The distributed computing system includes one or more processors and system memory having stored thereon executable instructions. When the executable instructions are executed by the processors, the computing system receives a new event that is to be added to a queue of events that are to be executed by the distributed computing system, determines that there is a current active event in the queue, compares a priority of the new event with a priority of the current active event, and based on the comparison, modifies an order of the events in the queue by updating the event in the queue that is to be the current active event.

Another embodiment is related to systems and methods for a scheduling manager or other element of a distributed computing system to schedule events performed by various computing systems based on a priority of the events. The distributed computing system may include one or more processors and system memory having stored thereon executable instructions. When the executable instructions are executed by the processors, the computing system receives a new event that is to be added to a queue of events that are to be executed by the distributed computing system, where the new event and the events in the queue include priority information and reorder information. The computing system also updates an order of the events in the queue when the priority information of the received new event indicates a higher priority than the priority information of a current active event in the queue. During updating the order of the events in the queue, the reorder information of at most two of the events is updated.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 6 illustrates a flow chart of an example method for a scheduling manager or other element of a distributed computing system to schedule events performed by a plurality of computing systems based on a priority of the events; and FIG. 7 illustrates a flow chart of an alternative example method for a scheduling manager or other element of a distributed computing system to schedule events performed by a plurality of computing systems based on a priority of the events.

DETAILED DESCRIPTION

Figure 1:
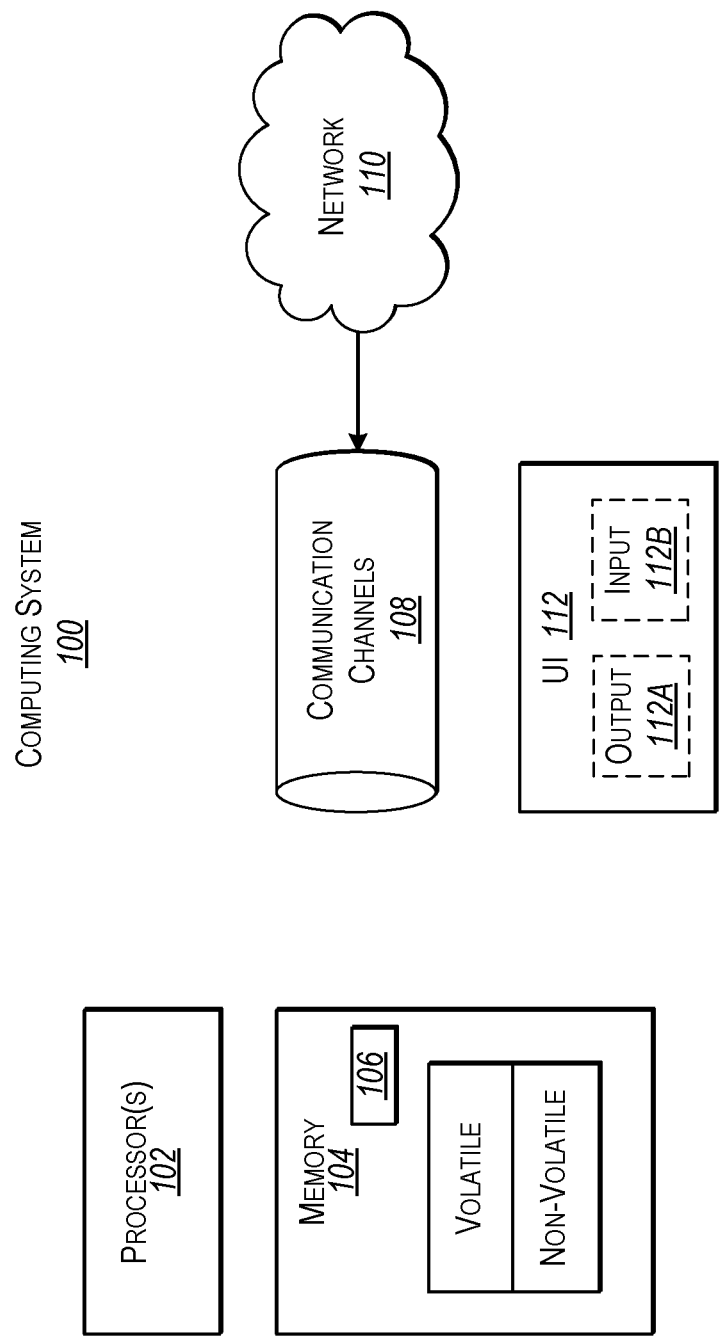
FIG. 1 illustrates a computing system in which some embodiments described herein may be employed.

A priority queue is a data structure where each events in the queue has a "priority" associated with it. In a typical priority queue, an event with high priority is served before an event with low priority. If two events have the same priority, they are served according to their order in the queue.

One type of priority queue is typically implemented on a single computing device that manages events using a first-in, first out (FIFO) structure. Accordingly, any time a new event with a higher priority than one or more events already in the priority queue is added to the queue, the new event is placed ahead of any lower priority events and thus the priority queue is reordered. However, this requires that all of the events in the queue be updated any time a new event is added to the queue. This may use a large amount of computing resources when a large number of new events are added.

Another priority queue system is based on separate queues or buckets, typically one for each type of priority. For example, all high priority events are placed in a first queue or bucket, all middle priority events are placed in a second queue or bucket, and all lower priority events are placed in a third queue or bucket. However, such system requires the computing system implementing the various queues or buckets to know the indices of each queue or bucket so that the events may be properly placed. In addition, inside each queue or bucket all of the events in the queue are updated any time a new event is added to the queue. Further, a consumer of the events in the queues or buckets may have to monitor all of the queues or buckets to ensure that the event with the highest priority is used before a lower priority event. This may also use a large amount of computing resources when a large number of new events are added.

Advantageously, the embodiments disclosed herein are related to systems and methods for a scheduling manager or other element of a distributed computing system to schedule events performed by a various computing systems based on a priority of the events. The distributed computing system includes one or more processors and system memory having stored thereon executable instructions. When the executable instructions are executed by the processors, the computing system receives a new event that is to be added to a queue of events that are to be executed by the distributed computing system, determines that there is a current active event in the queue, compares a priority of the new event with a priority of the current active event, and based on the comparison, modifies an order of the events in the queue by updating the event in the queue that is to be the current active event.

Another embodiment is related to systems and methods for a scheduling manager or other element of a distributed computing system to schedule events performed by various computing systems based on a priority of the events. The distributed computing system may include one or more processors and system memory having stored thereon executable instructions. When the executable instructions are executed by the processors, the computing system receives a new event that is to be added to a queue of events that are to be executed by the distributed computing system, where the new event and the events in the queue include priority information and reorder information. The computing system also updates an order of the events in the queue when the priority information of the received new event indicates a higher priority than the priority information of a current active event in the queue. During updating the order of the events in the queue, the reorder information of at most two of the events is updated.

There are various technical effects and benefits that can be achieved by implementing aspects of the disclosed embodiments. By way of non-limiting example, since the events include the priority information that indicates their priority, there is no need for multiple queues or buckets having an index for each type of priority. Rather, as described the scheduling manager is able to place an event in the single queue or bucket based on its priority information and not on the index of the bucket. In addition, because there is only one queue or bucket, a consumer need not monitor multiple buckets to determine which event it should be using at a given time. Rather, the scheduling manager ensures that the event with the highest priority is always at the front of the queue. Further, there is no need to update every event in the queue or bucket. Rather, at most only two of the events need be updated, which significantly saves computing resources in comparison to conventional systems. Further, the technical effects related to the disclosed embodiments can also include improved user convenience and efficiency gains.

Some introductory discussion of a computing system, distributed computing system, and virtual machines will be described with respect to FIGS. 1-3. Then, systems and methods for a scheduling manager or other element of a distributed computing system to schedule events performed by a various computing systems based on a priority of the events with respect to FIG. 4A through FIG. 7.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
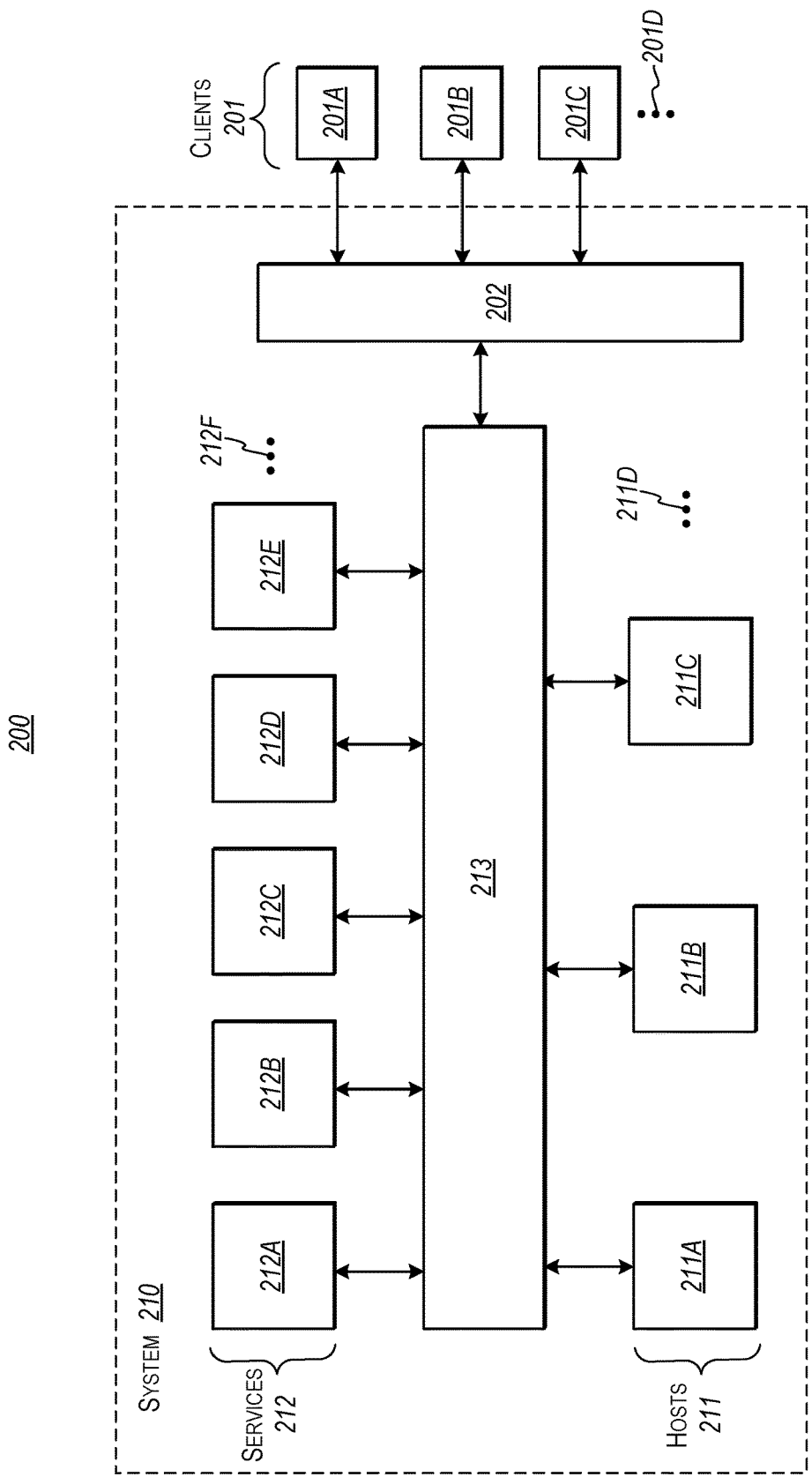
FIG. 2 illustrates a distributed environment in which some embodiments described herein may be employed.
Figure 3:
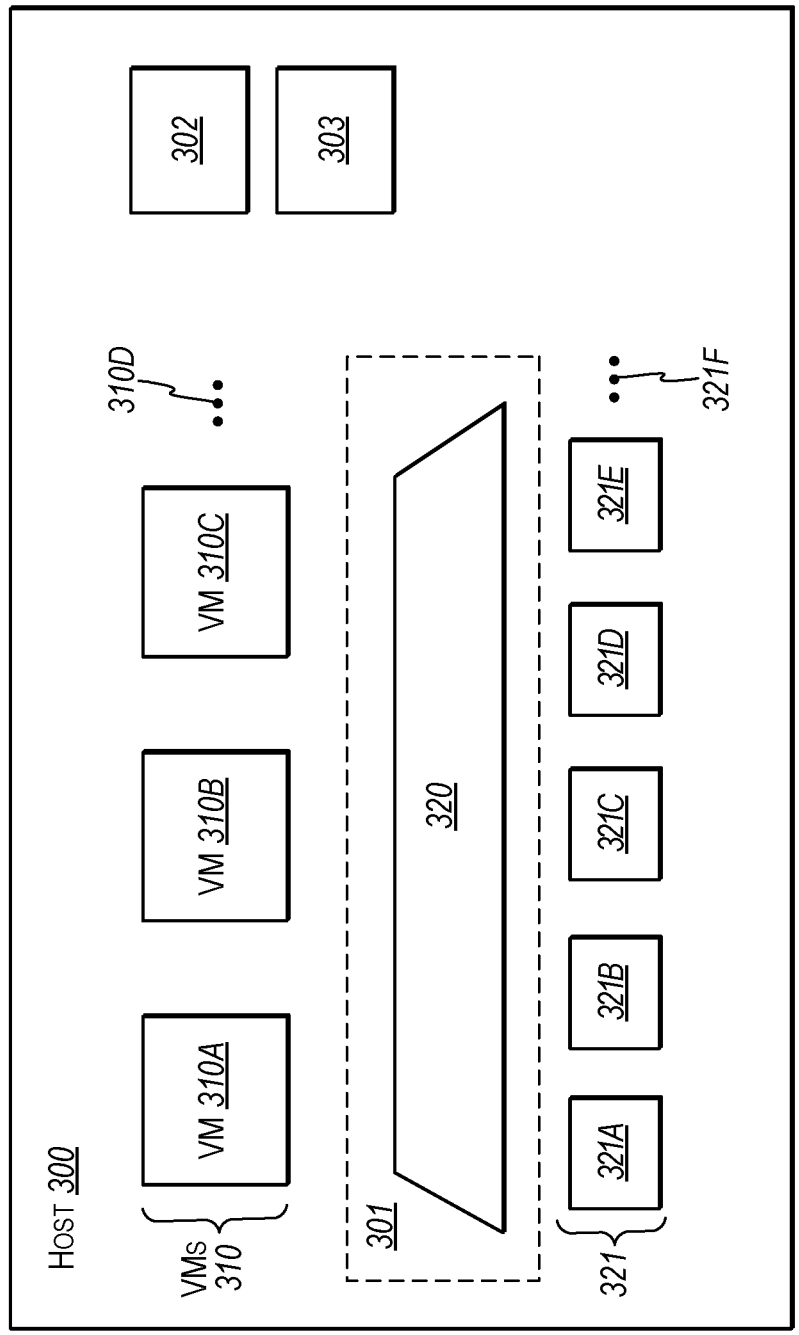
FIG. 3 illustrates a host computing system of the distributed environment of FIG. 2 that hosts multiple virtual machines and provides access to physical resources through a hypervisor.

FIG. 2 abstractly illustrates an environment 200 in which the principles described herein may be employed. The environment 200 includes multiple clients 201 interacting with a system 210 using an interface 202. The environment 200 is illustrated as having three clients 201A, 201B and 201C, although the ellipses 201D represent that the principles described herein are not limited to the number of clients interfacing with the system 210 through the interface 202. The system 210 may provide services to the clients 201 on-demand and thus the number of clients 201 receiving services from the system 210 may vary over time.

Each client 201 may, for example, be structured as described above for the computing system 100 of FIG. 1. Alternatively or in addition, the client may be an application or other software module that interfaces with the system 210 through the interface 202. The interface 202 may be an application program interface that is defined in such a way that any computing system or software entity that is capable of using the application program interface may communicate with the system 210.

The system 210 may be a distributed system, although not required. In one embodiment, the system 210 is a cloud computing environment. Cloud computing environments may be distributed, although not required, and may even be distributed internationally and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The system 210 includes multiple hosts 211, that are each capable of running virtual machines. Although the system 200 might include any number of hosts 211, there are three hosts 211A, 211B and 211C illustrated in FIG. 2, with the ellipses 211D representing that the principles described herein are not limited to the exact number of hosts that are within the system 210. There may be as few as one, with no upper limit. Furthermore, the number of hosts may be static, or might dynamically change over time as new hosts are added to the system 210, or as hosts are dropped from the system 210. Each of the hosts 211 may be structured as described above for the computing system 100 of FIG. 1.

Each host is capable of running one or more, and potentially many, virtual machines. For instance, FIG. 3 abstractly illustrates a host 300 in further detail. As an example, the host 300 might represent any of the hosts 211 of FIG. 2. In the case of FIG. 3, the host 300 is illustrated as operating three virtual machines 310 including virtual machines 310A, 310B and 310C. However, the ellipses 310D once again represents that the principles described herein are not limited to the number of virtual machines running on the host 300. There may be as few as zero virtual machines running on the host with the only upper limit being defined by the physical capabilities of the host 300.

During operation, the virtual machines emulates a fully operational computing system including an at least an operating system, and perhaps one or more other applications as well. Each virtual machine is assigned to a particular client, and is responsible to support the desktop environment for that client.

The virtual machine generates a desktop image or other rendering instructions that represent a current state of the desktop, and then transmits the image or instructions to the client for rendering of the desktop. For instance, referring to FIGS. 2 and 3, suppose that the host 300 of FIG. 3 represents the host 211A of FIG. 2, and that the virtual machine 310A is assigned to client 201A (referred to herein as "the primary example"), the virtual machine 310A might generate the desktop image or instructions and dispatch such instructions to the corresponding client 201A from the host 211A via a service coordination system 213 and via the system interface 202.

As the user interacts with the desktop at the client, the user inputs are transmitted from the client to the virtual machine. For instance, in the primary example and referring to FIGS. 2 and 3, the user of the client 201A interacts with the desktop, and the user inputs are transmitted from the client 201 to the virtual machine 310A via the interface 201, via the service coordination system 213 and via the host 211A.

The virtual machine processes the user inputs and, if appropriate, changes the desktop state. If such change in desktop state is to cause a change in the rendered desktop, then the virtual machine alters the image or rendering instructions, if appropriate, and transmits the altered image or rendered instructions to the client computing system for appropriate rendering. From the prospective of the user, it is as though the client computing system is itself performing the desktop processing.

The host 300 includes a hypervisor 320 that emulates virtual resources for the virtual machines 310 using physical resources 321 that are abstracted from view of the virtual machines 310. The hypervisor 321 also provides proper isolation between the virtual machines 310. Thus, from the perspective of any given virtual machine, the hypervisor 320 provides the illusion that the virtual machine is interfacing with a physical resource, even though the virtual machine only interfaces with the appearance (e.g., a virtual resource) of a physical resource, and not with a physical resource directly. In FIG. 3, the physical resources 321 are abstractly represented as including resources 321A through 321F. Examples of physical resources 321 including processing capacity, memory, disk space, network bandwidth, media drives, and so forth.

The host 300 may operate a host agent 302 that monitors the performance of the host, and performs other operations that manage the host. Furthermore, the host 300 may include other components 303.

Referring back to FIG. 2, the system 200 also includes services 212. In the illustrated example, the services 200 include five distinct services 212A, 212B, 212C, 212D and 212E, although the ellipses 212F represent that the principles described herein are not limited to the number of service in the system 210. A service coordination system 213 communicates with the hosts 211 and with the services 212 to thereby provide services requested by the clients 201, and other services (such as authentication, billing, and so forth) that may be prerequisites for the requested service.

Figure 4A:
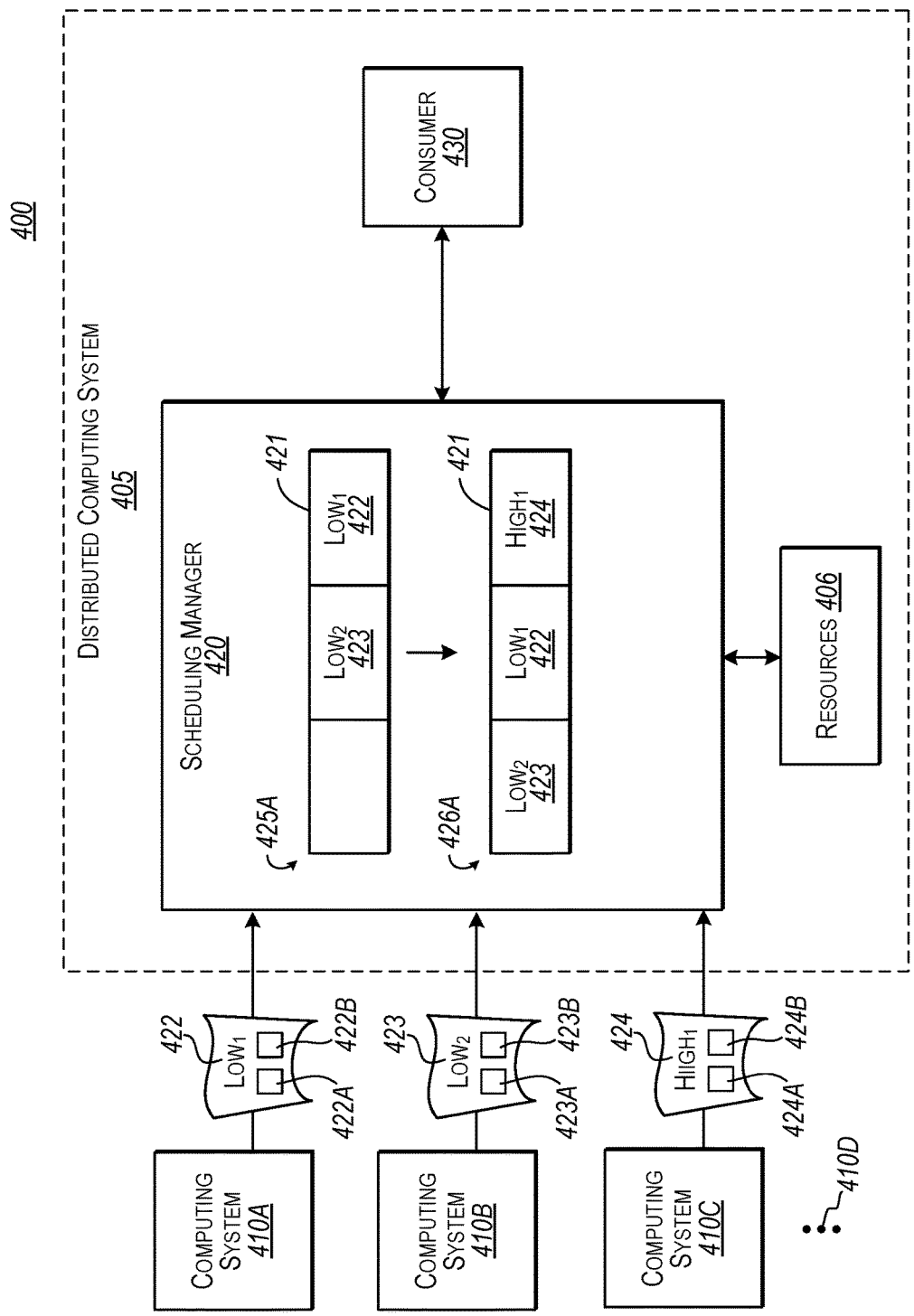
FIGS. 4A and 4B illustrate an environment for scheduling events based on priority.

Referring now FIG. 4A, an embodiment of an environment for scheduling events based on priority is shown. As illustrated, the environment 400 includes various elements and/or functional modules as will be explained in more detail to follow. It will be appreciated, however, that the environment 400 may include more or less elements than those illustrated in FIG. 4A and that one or more of the elements may be combined as circumstances warrant. It will also be appreciated that the various elements and/or functional modules of environment 400 may have access to processing resources and/or memory resources such as processors 102 and memory 104.

The environment 400 may include a distributed computing system as illustrated by ellipses 405. The distributed computing system 405 may correspond to the distributed system 210 and thus may be implemented across various physical and/or virtual machines as previously described above in relation to FIGS. 1-3. Accordingly, the various elements the environment 400 may be implemented by the distributed computing system 405.

The environment 400 may include various computing systems (hereinafter also referred to collectively as "computing systems 410") 410A, 410B, 410C, and potentially any number of additional computing systems as illustrated by the ellipses 410D. Although not explicitly shown in FIG. 4A for ease of illustration, the computing systems 410 may be implemented by distributed computing system 405. The computing systems 410 may correspond to the computing system 100 and/or the clients 201 previously described, although the computing systems 410 may be any reasonable computing system as circumstances warrant.

In one embodiment, the computing systems 410 may be computing systems that related to the same user or entity. For example, the computing system 410A may be a desktop computer of a given user, the computing system 410B may be a mobile phone of the given user, and the computing system 410C may be another mobile device of the given user. In other embodiments, however, the computing systems 410 need not be related to the same user or entity. For example, the computing system 410A may be a computing device (i.e., desktop computer or mobile computing device) of a first given user or entity, the computing system 410B may be a computing device (i.e., desktop computer or mobile computing device) of a second given user or entity, and the computing system 410C may be a computing device (i.e., desktop computer or mobile computing device) of a third given user or entity.

The environment 400 may further include a scheduling manager component 420, which will hereinafter be referred to as simply scheduling manager 420. As illustrated the scheduling manager 420 may be implemented by the distributed computing system 405, although this is not required as in some embodiments the scheduling manager may be implemented on a single computing system.

The scheduling manager 420 may store or otherwise have access to a scheduling queue or bucket 421. In operation, the scheduling manager 420 may receive various events, such as events 422, 423, and 424, from one or more of the computing systems 410 for execution by the distributed computing system 405 on behalf of a consumer 430. The events 422, 423, and 424 may be a read or a write message for one or more computing resources 406 that are to be used by the consumer 430. That is, the computing resources represent the resources of the distributed computing system such as storage disks, protocol stacks, and the like that are used to provide the necessary information to the consumer 430. It will be noted that although the embodiments disclosed herein discuss the three events 422, 423, and 424, the embodiments disclosed herein are not limited to only three events.

It will be appreciated that the consumer 430 may be any application or the like that uses the events. For example, the consumer 430 may be a calendar application that uses the events to schedule meetings or to reserve conference rooms. The consumer 430 may also be a provider of Wi-Fi service that uses to the events to determine the level of service each of the computing systems 410 is entitled to. Accordingly, the embodiments disclosed herein are not limited by the type of the consumer 430.

The events 422, 423, and 424 may then be placed in the queue or bucket 421 according to their priority. In one embodiment the events 422, 423, and 424 may include priority information or metadata that specifies the priority of the event. For example, as illustrated in FIG. 4A, the event 422 may include priority information 422A, the event 423 may include priority information 423A, and the event 424 may include priority information 424A.

The priority information 422A, 423A, and 424A may comprise any information that informs the scheduling manager 420 of the priority of the event. For example, in one embodiment the priority information may identify the type of or the sender of the embodiment. For instance, the priority information may specify that the sender of event 422 is the CEO of a company and the sender of the event 423 was a normal worker of the company. In an embodiment where the consumer 430 was a room schedule application, the priority information or metadata may specify that the CEO should have priority over the worker that is scheduling a conference room. In another embodiment, the priority information may specify that the sender of the event 424 is entitled to a higher level of service for Wi-Fi service than the sender of the event 423. In an embodiment to be discussed in further detail to follow, the priority information may be a time stamp associated with each of the events where the most recent time stamp signifies that an event has higher priority over the other events. Accordingly, the embodiments disclosed herein are not limited by the type of the priority information.

As also illustrated in FIG. 4A, the events 422, 423, and 424 may also include reorder information. For example, the event 422 may include reorder information 422B, the event 423 may include reorder information 423B, and the event 4224 may include reorder information 424B. The reorder information may be any information that is used by the scheduling manager 420 to update the order of the events in the queue or bucket 421. In one embodiment to be discussed in further detail to follow, the reorder information may include one or more of start time, update time, end time, and time remaining for each of the events. Accordingly, the embodiments disclosed herein are not limited by the type of the reorder information.

A specific example will now be described in relation to FIG. 4A. As shown, the scheduling manager 420 may receive the event 422 from the computing system 410A and the event 423 from the computing system 410B. In the example, the priority information 422A identifies the priority of the event 422 as Low1 and the priority information 413A identifies the priority of the event 423 as Low2. Accordingly, the scheduling manager 420 may place the events 422 and the 423 in the queue or bucket 421 as shown at 425A. It will be noted that although the events 422, 423 and 424 are shown as being sent from a different computing systems 410 in this example and in the following examples, this is for ease of explanation only as more than one or even all of the events may be sent from the same computing system 410.

Since the event 422 Low1 is at the front of the queue or bucket 421, it may be considered as a current active event as it is the event that is available for use by the consumer 430. In other words, in the embodiment the event that is available for use by the consumer 430 may be considered the current active event and since only one event is typically available for use by the consumer 430, there typically is only one current active event.

The scheduling manager 420 may then receive the event 424 from the computing system 410C and may compare the priority of the event 424 with the priority of the event 422 since it is the active event. Since the event 424 is received after the events 422 and 423, it may be considered a new event in the embodiments and claims herein. In this example, the priority information 424A identifies the priority of the event as High1, which is a higher priority than the Low1 priority of the event 422. Accordingly, as shown at 426A, the scheduling manager 420 may modify or reorder the order of the events in the queue or bucket 421 by updating the current active event in the queue. As shown, the scheduling manager 421 may place the event 424 having the High1 priority in front of the event 422 since it has a higher priority. The event 424 may then be available for use by the consumer 430 before the other events in the queue. Accordingly, the event 424 may be considered the active event since it is now available for use by the consumer 430. Any remaining execution of the event 422 is suspended until the completion of the event 424, at which time the event 422 may become the active event again and its execution may be completed.

As mentioned above and as will be described in more detail to follow, in some embodiments the scheduling manager 420 may update or otherwise modify the reorder information of the events in the queue 421 when modifying the order of the events in the queue or bucket 421. In such embodiment, the scheduling manager 420 need only update at most two of the events. For example, the scheduling manager 420 need only update the reorder information of the event 424 High1 to place it in the front of the queue and thus make it the active event and update the reorder information of the event Low1 so that it is no longer the active event in the queue. Since event 423 Low2 is already behind event 422 Low1 in the queue, there is no need to update this event (or any event following the event 423) since it was not first in the queue and thus will not become the active event and be executed until event 422 Low1 has completed being executed.

In some embodiments, the scheduling manager 420 may detect that there is no current active event in the queue 421. This may occur when the events already in the queue such as event 422 and 423 have not yet reached their specified start time. In such embodiments, upon receipt of the event 424 which has the higher priority than the events 422 and 423, the scheduling manager 420 make set the event 424 as the current active event so that is available for use by the consumer 430 or it may set the event 424 to be the current active event at a later time, such as when the event 424 reaches a designated start time.

Figure 4B:
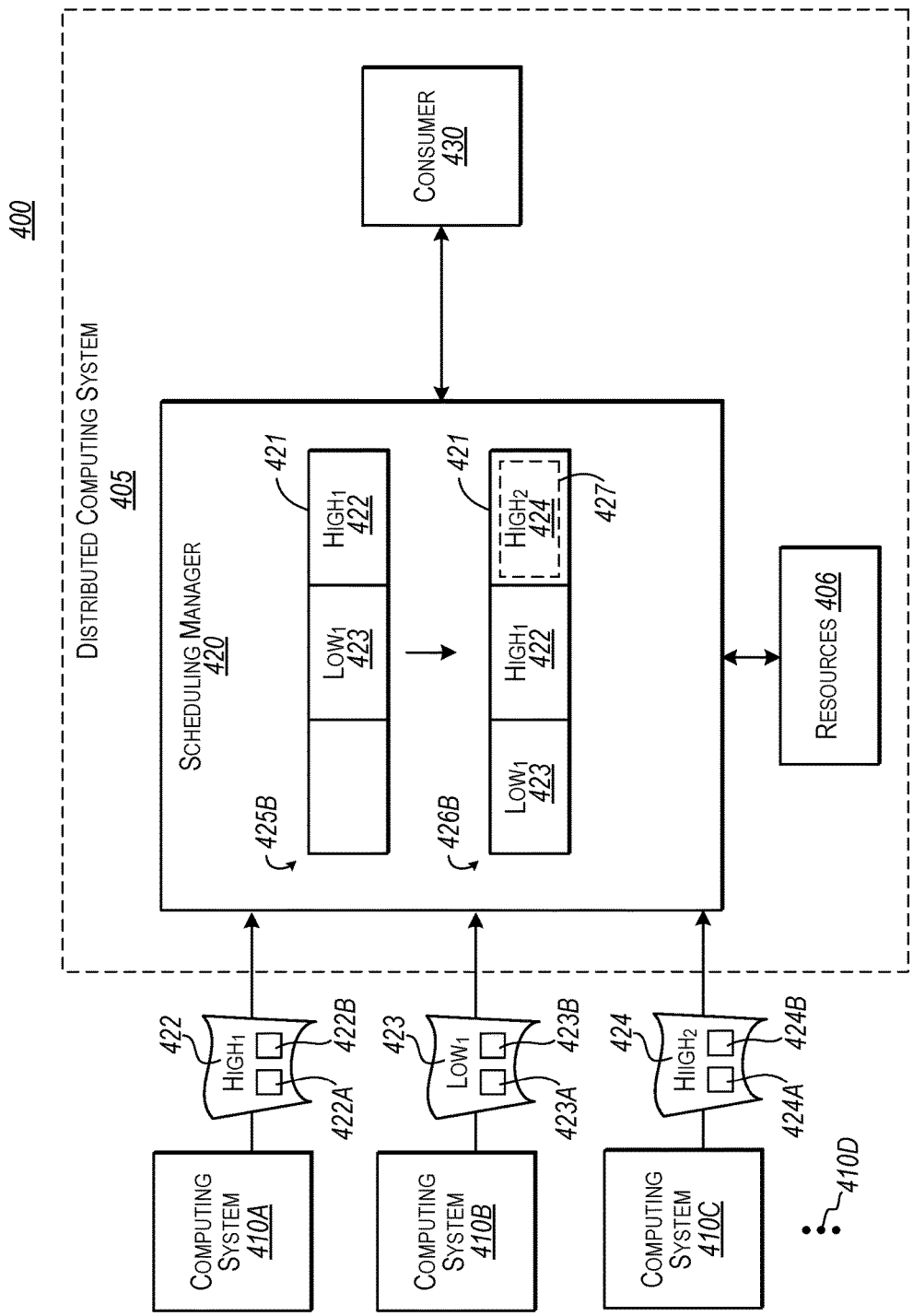

FIG. 4B illustrates an alternative example of the environment 400. As shown, the scheduling manager 420 may receive the event 422 from the computing system 410A and the event 423 from the computing system 410B. In the example, the priority information 422A identifies the priority of the event 422 as High1 and the priority information 413A identifies the priority of the event 423 as Low1. Accordingly, the scheduling manager 420 may place the events 422 and the 423 in the queue or bucket 421 as shown at 425B. The event 422 High1 may be current the active event.

The scheduling manager 420 may then receive the event 424 from the computing system 410C and may compare the priority of the event 424 with the priority of the current active event 422. In this example, the priority information 424A identifies the priority of the event as High2, which is the same priority as the priority of the event 422. Accordingly, as shown at 426A, the scheduling manager 420 may modify or reorder the order of the events in the queue or bucket 421 by updating the current active event in the queue. In this example, the scheduling manager 420 may modify the order of the by extending the duration or time remaining of the event 422. This is represented in FIG. 4B by the dashed lines 427. Since event 423 Low2 is already behind event 422 High1 in the queue, there is no need to update this event (or any event following the event 423) since it was not first in the queue and thus will not become the active event and be executed until event 422 High1 as completed being executed.

The embodiments of FIG. 4A and FIG. 4B provide significant advantages over conventional scheduling systems. For example, since the events include the priority information that indicates their priority, there is no need for multiple buckets having an index for each type of priority. Rather, as described the scheduling manager 420 is able to place an event in the single queue or bucket based on it priority information and not on the index of the bucket. In addition, because there is only one queue or bucket, the consumer 430 need not monitor multiple buckets to determine which event it should be using at a given time. Rather, as described above the scheduling manager 420 ensures that event with the highest priority is always at the front of the queue. Further, there is no need to update every event in the queue or bucket. Rather, as described above at most only two of the events need be updated, which significantly saves computing resources in comparison to conventional systems.

Referring now to FIGS. 5A-5D, a specific embodiment of the environment 400 is illustrated. Accordingly, for ease of explanation FIGS. 5A-5D only show the scheduling manager 420 and specific embodiments of the events 422, 423, and 424 along with specific embodiments of their respective priority and reorder information.

Figure 5A:
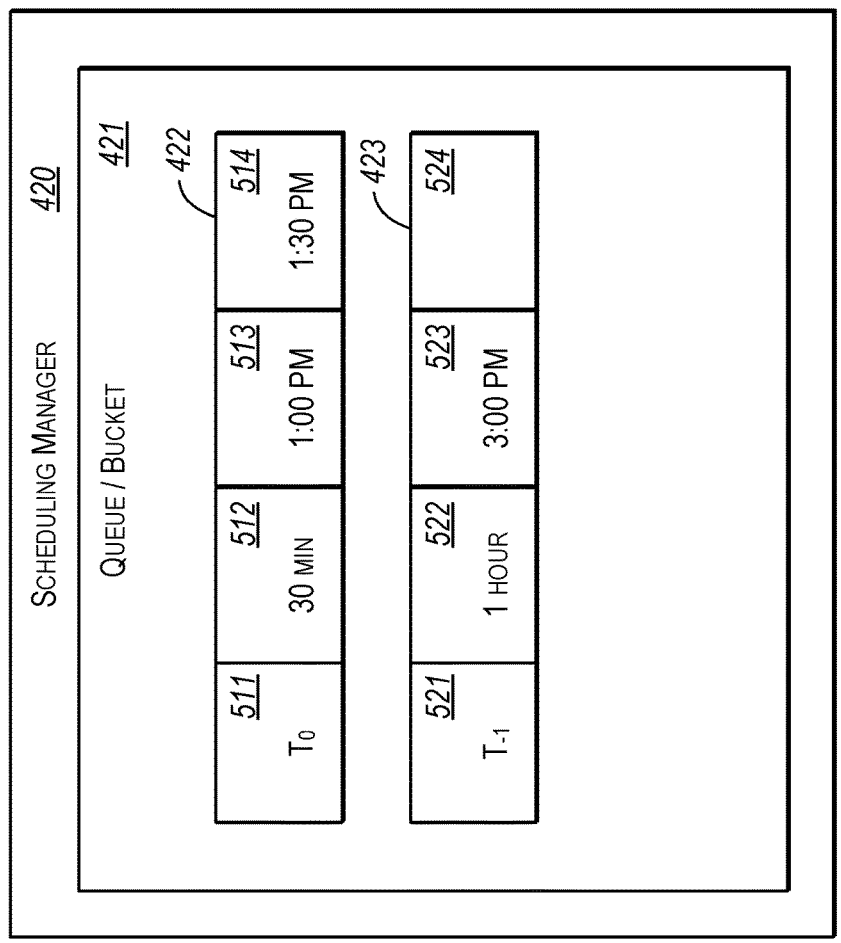
FIGS. 5A-5D illustrate example embodiments of the environment of FIG. 4.

FIG. 5A shows a specific embodiment of the event 422 and the event 423 before the receipt of the event 424. As shown, the event 422 includes a time stamp 511 labeled $T_0$ and the event 423 includes a time stamp 521 labeled $T_{-1}$ that indicate the time the event is received by the scheduling manager 420. The time stamps 511 and 521 may be examples of the priority information 422A and 423A respectively.

The event 422 also includes a duration or time remaining 512, which in the embodiment is 30 minutes and a start time 513, which in the embodiment is 1:00 PM. The event 423 includes a duration or time remaining 522, which in the embodiment is 1 hour and a start time 523, which in the embodiment is 3:00 PM. In the embodiment, the scheduling manager 420 (or some other element of the distributed computing system 405) may set the end time for event that is considered to be the current active event. Thus, in the embodiment, the event with both a start time that is equal to a current time and having a set end time is the active event. In other words, when the start time of an event in the queue equals the current time, the scheduling manager 420 will set an end time that is equal current time plus the duration or time remaining 512, which will make the event the current active event and will make the event available for use by the consumer 430. Thus, in the embodiment, assuming the current time is 1:00 PM, the event 422 also includes an end time 514, which has been set to 1:30 PM since this is 30 minutes beyond the current time/start time. However, the end time 524 for the event 423 has not yet been set by the scheduling manager 420 since the event 423 is not the current active event. The elements 512-514 and 522-524 may be examples of the reorder information 422A and 422B respectively.

Figure 5B:
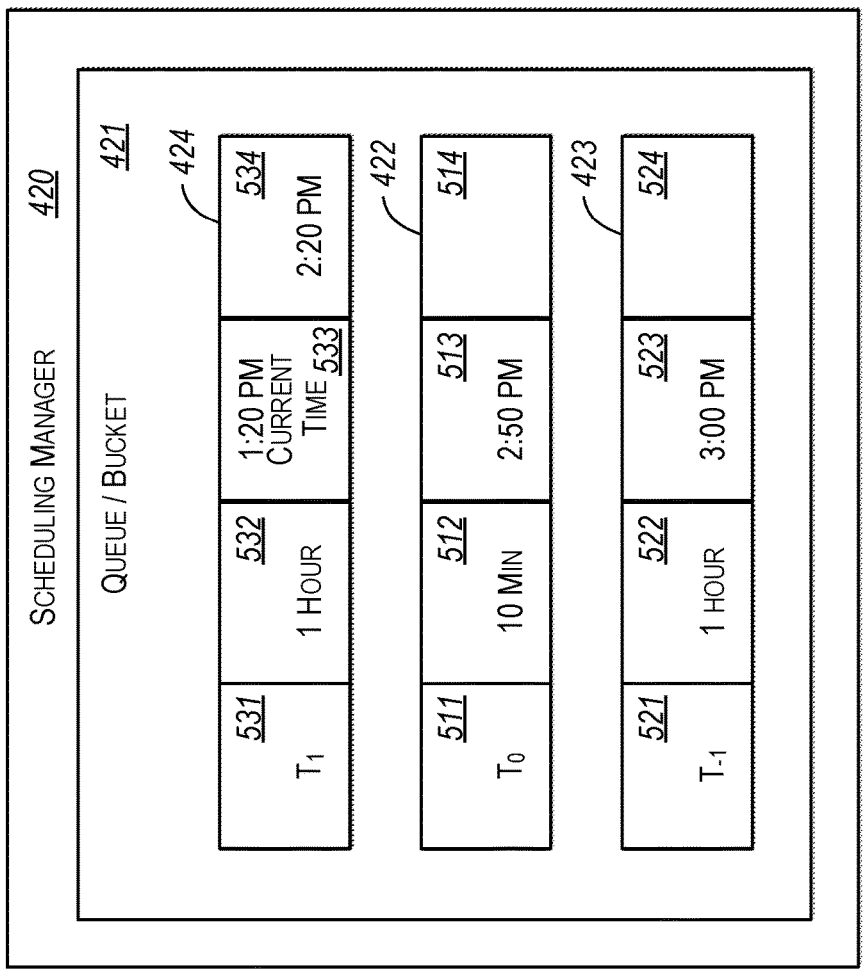

FIG. 5B illustrates an embodiment of where the event 424 having a higher priority is received by the scheduling manager 420 after the event 422 has been the current active event for at least a portion of its duration as shown in FIG. 4A. For example suppose that the event 424 is received by the scheduling manager 420 at a time T1 that is more recent than the times of the events 422 and 423 as reflected by the timestamp 531. In the embodiment, the scheduling manager 420 may interpret the more recent time stamp as meaning that the event 424 is of a higher priority than the events currently in the queue or bucket 421, especially the current active event 422. In other words, since it is likely that an event will only be sent at a later time if it is to take priority over the existing events, the system may infer from the later time stamp that the event is to be of higher priority. Thus, by comparing the timestamps of the event 422 and 424 the scheduling manager is able to determine that the event 424 has priority over the event 422. In some embodiments, there may be additional priority information in addition to the time stamps that is used to determine the priority of the events.

Once the scheduling manager 420 has determined that the event 424 has priority, the scheduling manager may set the start time 533 of the event 424 as the current time and may also set the end time 534 of the event as the current time plus the duration or time remaining 532 of event 425. In addition, the scheduling manager 420 may remove the end time 514 of the current active event 422 and may update the duration or time remaining 512 of the event 422 to be the end time minus the current time. This updating or modifying of the reorder information 422B and 424B will result in the event 424 becoming the current active event and the event 422 no longer being the current active event.

A specific example will now be explained. Suppose that the current time when the event 424 is received is 1:20 PM and suppose that the event 424 has a duration or time remaining 532 of 1 hour as shown in FIG. 4B. In such case, the start time 533 would be set to the current time of 1:20 PM and the end time 534 would be set to 2:20 PM. In addition, the end time of 514 of 1:30 PM of the event 422 is removed and the duration or time remaining 512 is set to 10 minutes since this is the end time of 1:30 minus the current time of 1:20.

It will be noted that the reorder information for the event 423 is not updated or modified while the scheduling manager updates the current event to thereby change the order of the events in the queue. Rather, once the event 424 is completed, the event 422 will once again become the current active event its start time will be set to the current time and will remain the current active event for the remaining 10 minute duration. The event 423 will become the active event when its start time becomes the current time and an end time is set. Thus, the event 423 or any events in the queue behind it are never updated or modified while the event 424 remains the current active event. Thus, at most in the embodiment only two of the events are updated or modified when modifying the order of the events in the queue.

Figure 5C:
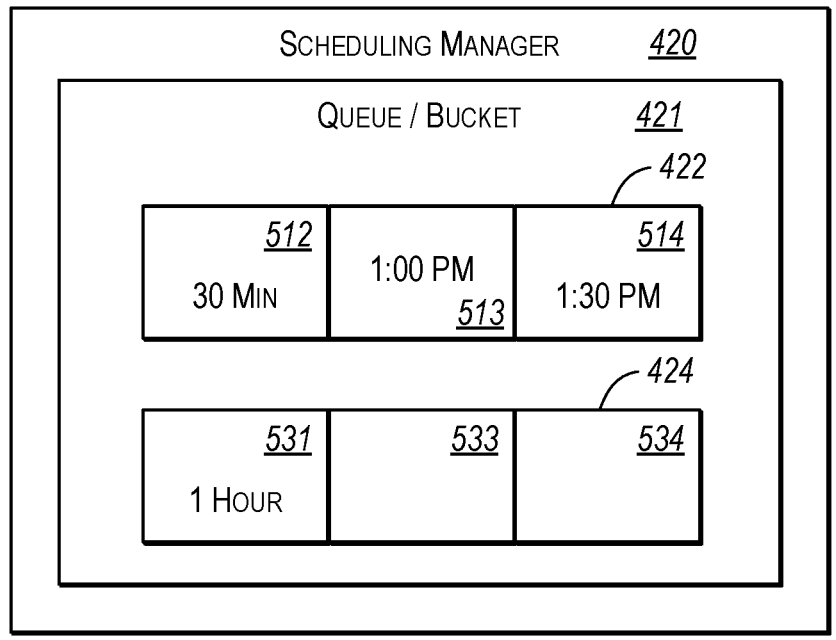

FIG. 5C shows an embodiment where the scheduling manager 420 has received the events 422 at one time period and received the event 424 at a second time period and has determined that both events have the same priority. Accordingly, for ease of explanation FIG. 5C only shows some of the reorder information for each of these events. As illustrated, event 422 includes a duration or time remaining 512, which in the embodiment is 30 minutes, a start time 513, which in the embodiment is 1:00 PM, and has an end time set to 1:30 PM since it is the current active event. The event 424 includes a duration or time remaining 532 of 1 hour.

Figure 5D:
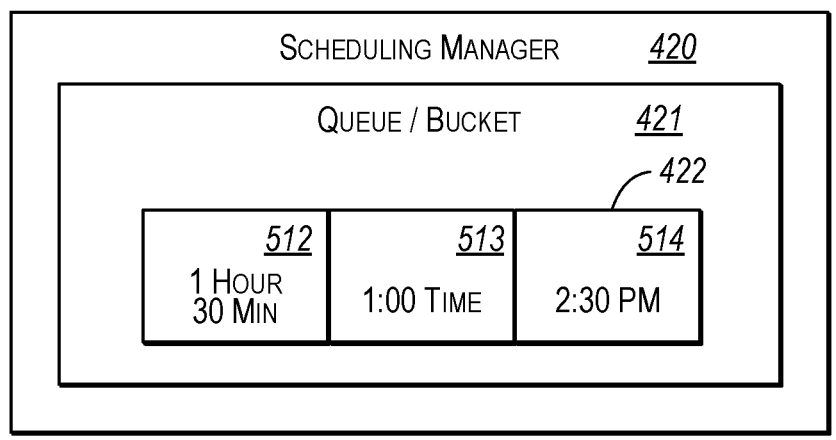

Since both of the events have the same priority, as shown in FIG. 5D the scheduling manager 421 may extend the end of the current active event 422. As shown in FIG. 5D, this is done by adding the duration or time remaining 531 of the event 424 to the current time, updating the duration or time remaining 513 of the event 422, and also updating the end time 514 of the event 422 to reflect the added duration. In a specific example, suppose the start time of the event 422 is the current time. In such example, the duration or time remaining of the event 422 would be updated to 1 hour and 30 minutes and the end time 514 would be updated to 2:30 PM. Accordingly, in this embodiment at most only two events are updated as only the event 422 is updated. As with previous embodiments, any events in the queue after the event 422 would not be updated until the event 422 was no longer the current active event.

In some embodiments, the scheduling manager may determine upon receipt of the event 424 that there is no current active event. In such embodiments, the scheduling manager 420 may set the start time of the event 424 to the current time and may also set the end time of the event in the manner previously described to thereby make the event 424 the current active event. Alternatively, the scheduling manager 420 may designate a start time for the event that is before any other event in the queue to thereby designating the event 424 to be the current active event at the time when its start time become the current time. In such embodiments, only the event 424 is modified when changing the order of the events in the queue 421.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

FIG. 6 illustrates an example method 600 for a scheduling manager or other element of a distributed computing system to schedule events performed by a plurality of computing systems based on a priority of the events. The method 600 will be described with respect to one or more of FIGS. 2-5D discussed previously.

The method 600 includes receiving a new event that is to be added to a queue of events that are to be executed by the distributed computing system (act 610). For example as previously discussed the scheduling manager 420 may receive a new event 424 to be added to the queue or bucket 421. The queue or bucket 421 may already include the events 422 and 423. As discussed, the events 422, 423, and 424 may be used by the consumer 430.

The method 600 includes determining that there is a current active event in the queue (act 620) and comparing a priority of the new event with a priority of the current active event (act 630). For example, as previously described the scheduling manager 420 may determine if there is a current active event in the queue 421 and may compare a priority of the new event 424 with the priority of the current active event. For instance, as in the embodiments disclosed above the event 422 may be the current active event and the priority of the event 422 may be compared with the priority of the event 424.

The method 600 includes, based on the comparison, modifying an order of the events in the queue by updating the event in the queue that is to be the current active event (act 640). For example, in one embodiment the scheduling module 420 may modify the events in the queue by making the new event 424 the current active event in the manner previously described. In another embodiment, the scheduling module 420 may modify the events in the queue by extending the duration of the current active event in the manner previously described. In still other embodiments, the scheduling manager 420 may, upon determining that there is no current active event, make the new event 424 the current active event or designate the new event 424 to be the current event at a later time in the manner previously described. In further embodiments, event type information may be supplemental to the priority and reordering information. In such case the scheduling module 420 may modify the events in the queue by extending the duration of an already existing event (which may or may not be the current active event) if the events are of same type. Then this event is made the current active event in the manner previously described. As described in the embodiments, at most only two of the events in the queue 421 are updated or modified.

FIG. 7 illustrates an example method 700 for a scheduling manager or other element of a distributed computing system to schedule events performed by a plurality of computing systems based on a priority of the events. The method 700 will be described with respect to one or more of FIGS. 2-5D discussed previously.

The method 700 includes receiving a new event that is to be added to a queue of events that are to be executed by the distributed computing system (act 710). The new event and the events in the queue include priority information and reorder information. For example as previously discussed the scheduling manager 420 may receive a new event 424 to be added to the queue or bucket 421. The queue or bucket 421 may already include the events 422 and 423. As discussed, the events 422, 423, and 424 may be used by the consumer 430. The event 422 may include priority information 422A and reorder information 422B, the event 423 may include priority information 423A and reorder information 423B, and the event 424 may include priority information 424A and reorder information 424B.

The method 700 includes updating an order of the events in the queue when the priority information of the received new event indicates a higher priority than the priority information of a current active event in the queue (act 720). For example, as previously described the scheduling manager 420 may update the order of the events in queue or bucket 421 when the priority of new event 424 is higher than the priority of the current active event in the queue, such as event 422. In one embodiment previously described the new event 424 is made to be the current active event. As also previously described, during updating the order of the events in the queue, the reorder information of at most two of the events is updated.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A distributed computing system including a scheduling manager that that controls the scheduling of events performed by a plurality of computing systems based on a priority of the events, the distributed computing system comprising:
one or more processors; and
system memory having stored thereon executable instructions that, when executed by the one or more processors, cause the distributed computing system to perform the following:
receive a new event that is to be added to a queue of events that are to be executed by the distributed computing system, the new event having a first duration comprising a first time period for completing the new event;
determine that there is an existing event at a front of the queue that is a current active executing event, the existing event having a second duration comprising a second time period for completing the existing event and a second end time computed based on the second duration of the existing event;
compare a priority of the new event with a priority of the existing event, including comparing a first time stamp associated with the new event with a second time stamp associated with the existing event;
based on the comparison, determine that the first time stamp associated with new event is more recent than the second time stamp associated with the existing event and that the new event is to therefore take priority over the existing event; and
modify the queue by at least,
inserting the new event at the front of the queue as a new currently active event, including setting a first end time of the new event to be the first duration of the new event plus a current time; and
updating the existing event by at least reducing the second duration of the existing event to be the second end time of the existing event minus the current time.

2. The distributed computing system of claim 1, wherein each event is associated with identity information that identifies a type of, or a sender of, the event.

3. The distributed computing system of claim 1, wherein the existing event and the new event each includes reorder information comprising one or more of a start time, an update time, or a time remaining.

4. The distributed computing system of claim 3, wherein the modifying the queue comprises updating the at most the new event and the existing event in the queue.

5. In a distributed computing system including a scheduling manager, a method for the scheduling manager to schedule events performed by a plurality of computing systems based on a priority of the events, the method comprising:
receiving a new event that is to be added to a queue of events that are to be executed by the distributed computing system, the new event having a first duration comprising a first time period for completing the new event;

determining that there is an existing event at a front of the queue that is a current active executing event, the existing event having a second duration comprising a second time period for completing the existing event and a second end time computed based on the second duration of the existing event;

comparing a priority of the new event with a priority of the existing event, including comparing a first time stamp associated with the new event with a second time stamp associated with the existing event;

based on the comparison, determine that the first time stamp associated with new event is more recent than the second time stamp associated with the existing event and that the new event is to therefore take priority over the existing event; and modifying the queue by at least,
    inserting the new event at the front of the queue as a new currently active event, including setting a first end time of the new event to be the first duration of the new event plus a current time; and
    updating the exiting event by at least reducing the second duration of the existing event to be the second end time of the existing event minus the current time.

6. The method of claim 5, wherein each event is associated with identity information that identifies a type of, or a sender of, the event.

7. The method of claim 5, wherein the existing event and the new event each includes reorder information comprising one or more of a start time, an update time, or a time remaining.

8. The method of claim 7, wherein the modifying the queue comprises updating the at most the new event and the existing event in the queue.

9. A computer program product comprising at least one hardware storage device having stored thereon computer-executable instructions that are executable by at least one processor to cause a computer system to control the scheduling of events performed by a plurality of computing systems based on a priority of the event, the computer-executable instructions including instructions that are executable by the at least one processor to cause the computer system to perform at least the following:

receive a new event that is to be added to a queue of events that are to be executed by the distributed computing system, the new event having a first duration comprising a first time period for completing the new event;

determine that there is an existing event at a front of the queue that is a current active executing event, the existing event having a second duration comprising a second time period for completing the existing event and a second end time computed based on the second duration of the existing event;

compare a priority of the new event with a priority of the existing event, including comparing a first time stamp associated with the new event with a second time stamp associated with the existing event;

based on the comparison, determine that the first time stamp associated with new event is more recent than the second time stamp associated with the existing event and that the new event is to therefore take priority over the existing event; and modify the queue by at least,
    inserting the new event at the front of the queue as a new currently active event, including setting a first end time of the new event to be the first duration of the new event plus a current time; and
    updating the existing event by at least reducing the second duration of the existing event to be the second end time of the existing event minus the current time.

10. The computer program product of claim 9, wherein each event is associated with identity information that identifies a type of, or a sender of, the event.

11. The computer program product of claim 9, wherein the existing event and the new event each includes reorder information comprising one or more of a start time, an update time, or a time remaining.

12. The computer program product of claim 11, wherein the modifying the queue comprises updating the at most the new event and the existing event in the queue.

\* \* \* \* \*